United States Patent [19]

Myers

[11] Patent Number: 5,002,292

[45] Date of Patent: Mar. 26, 1991

[54] SECURITY DEVICE FOR SHOPPING CARTS

[76] Inventor: Roy A. Myers, 666 Rancho Vista Rd., Vista, Calif. 92083

[21] Appl. No.: 535,508

[22] Filed: Jun. 11, 1990

Related U.S. Application Data

[63] Continuation-in-part of Ser. No. 364,833, Jun. 12, 1989, abandoned.

[51] Int. Cl.⁵ .............................................. B62D 39/00
[52] U.S. Cl. .............................................. 280/33.992
[58] Field of Search ..................... 280/33.991, 33.992, 280/33.994; 224/273

[56] References Cited

U.S. PATENT DOCUMENTS 2,895,243  7/1989  Hummer et al. ............... 280/33.992

FOREIGN PATENT DOCUMENTS 2325685  5/1974  Fed. Rep. of Germany ......................... 280/33.992
2310251  3/1978  France ............................ 280/33.992

Primary Examiner—Andres Kashnikow
Assistant Examiner—Richard M. Camby
Attorney, Agent, or Firm—John J. Murphey

[57] ABSTRACT

A novel security device for use in shopping carts including at least two elongated panels arranged for mutual contact between the basket side walls to form a three or four-sided enclosure wherein at least one of the panels contains a hinged elongated edge allowing pivotal movement to the panel for access to the enclosure and a lock to provide temporary security against unwanted entry.

10 Claims, 2 Drawing Sheets

SECURITY DEVICE FOR SHOPPING CARTS

CROSS-REFERENCE TO RELATED APPLICATIONS

This application ia continuation-in-part of my previous application Ser. No. 07/364,833 filed June 12, 1989, under same title, now abandoned.

BACKGROUND OF THE INVENTION

1. Field of the Invention

This invention pertains to security devices. More particularly, it pertains to a security device for temporary use by a shopper, in a store, in which to secure a purse to a shopping cart for safe-keeping so that it is neither stolen or broken into during the shopping spree.

2. Description of the Prior Art

Most shopping is done in supermarkets today using shopping carts. A typical shopping cart comprises a large, metal wire basket, a frame supporting the basket having ground-engaging wheels supporting the frame and a handle for pushing the cart around the store. In most shopping carts, a small shelf is made available inside the basket or adjacent the handle on which a shopper may place delicate items, small children or a purse.

Distasteful as it seems, there is a rising incidence of purses being stolen from shopping carts or pilfered while the attention of the shopper is drawn away from the cart toward items in the store. While it is possible in some instances to loop the long purse straps over the handle bar of the cart and slip the purse through the loop, thereby attaching it to the cart handle bar, such a configuration still allows someone to open the purse and steal the contents thereof while the shopper's attention is drawn to other matters in the store or while reaching or walking a short distance away from the cart to pick up an item. Some shoppers prefer to carry their purses on their shoulders, however, this poses problems of annoyance, in having the purse straps slip off the shoulder when reaching for items on the shelves, of some hazard in having the purse swing down and knock breakable items from the lower shelves, and of having the purse become stained or damaged by contact with fruits, meats or frozen items.

Most everyone, particularly women, carries a purse while shopping and it would be desirable to provide a secure purse enclosure on shopping carts. Not only would the enclosure be useful for securing the safety of the purse, but it would be useful for storing items bought elsewhere before the shopper came to the store. Such a device would be especially useful for senior citizens whose mobility is not always the best and further, would demonstrate to customers that the store is responsive to their needs for maintaining a secure environment during travel about the store's premises. The device would also be useful to women with small children in tow, giving them two completely free hands to better control the children as well as load the cart with merchandise. It is also believed the shopper would buy more merchandise since it stands to reason that a shopper with both hands free to load the cart would be likely to load the cart with more merchandise than he or she would if partially distracted with having to worry about his or her purse.

SUMMARY OF THE INVENTION

This invention is a novel security device for attachment to a shopping cart in which to store a purse or other relatively small items during the shopping spree. It comprises a plurality of panels that are connected in such a way as to form an enclosure, rectangular in shape as a rule, of sufficient size to accept most purses, the size depending to some extent on the part of the country the device is being used, since women in different parts of the country tend to carry different sizes of purses. At least one of the panels is hinged to provide access to the enclosure and means are provided for temporarily locking the enclosure in the cart while shopping in the store.

Accordingly, the main object of this invention is providing a security device for attachment to a wide variety of shopping carts for use by those who desire to have a temporarily secure enclosure in which to retain a purse during shopping sprees. Other objects of the invention include a means for securing the enclosure in the shopping cart to prevent total theft of the purse; a means to prevent unwanted access to the purse while it is in the enclosure; a means of providing store customers with a safe environment for their purses thus allowing them to leave the area around the cart to obtain items located a distance from the cart, and means to provide the store owner with not only a safety-service palatable to customers'needs but an additional source of potential income from those who desire to advertise on the individual panels of the security device.

These and other objects of the invention will become more apparent upon reading the description of the preferred embodiments when taken together with the drawings appended hereto. The scope of invention desired by the inventor may be gleaned from a fair reading of the claims which conclude this specification.

DESCRIPTION OF THE PREFERRED EMBODIMENT

Figure 1:
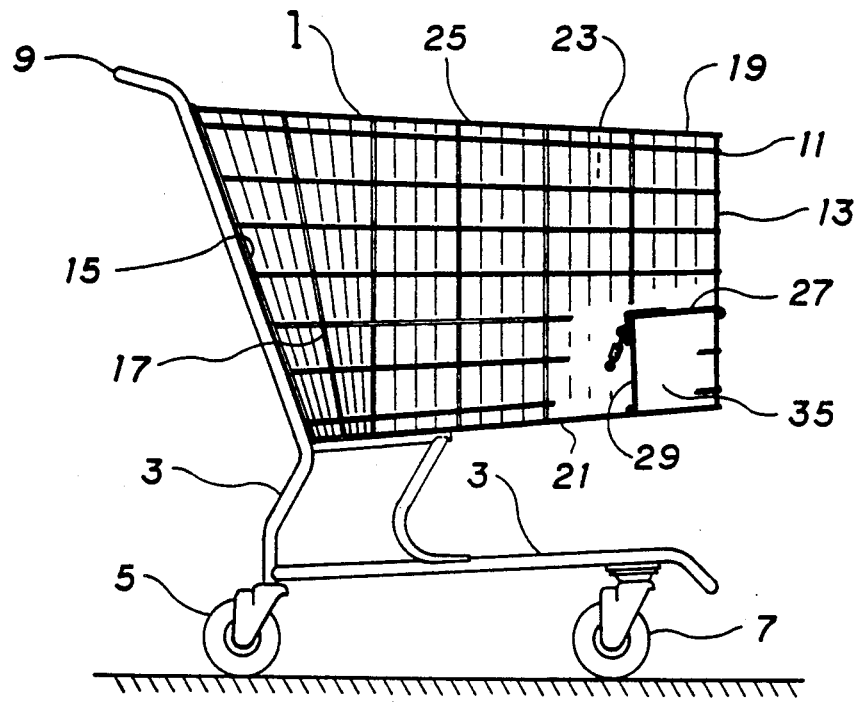
FIG. 1 is a side elevational view of a typical shopping cart showing one embodiment of the security device of this invention affixed to the front basket wall of the cart.

As shown in FIG. 1, a typical shopping cart 1, useful with this invention, is shown to comprise a tubular metal frame 3 supported on a pair of spaced-apart rear wheels 5 and journalized front wheels 7, wherein a handle 9 extends rearward from frame 1 for pushing the cart over the ground, said cart containing an open topped shopping basket 11 attached to frame 3 by lugs, bolts, etc., wherein basket 11 comprises integrally connected spaced-apart front and rear walls 13 and 15 respectively, a pair of spaced-apart side walls 17, that are all connected around the periphery 19 of basket floor 21. In some carts, rear basket wall 15 is hinged at the top to allow it to be swung forward when the carts are nested together in nose-to-tail fashion. Basket 11 forms an open top 23 into which the shopper places food items for purchase. Basket 11 is generally made from a series of small-diameter, strong, steel rods held in spaced-apart relation by larger-diameter edge rods 25 that frame the edges of open top 23.

Figure 2:
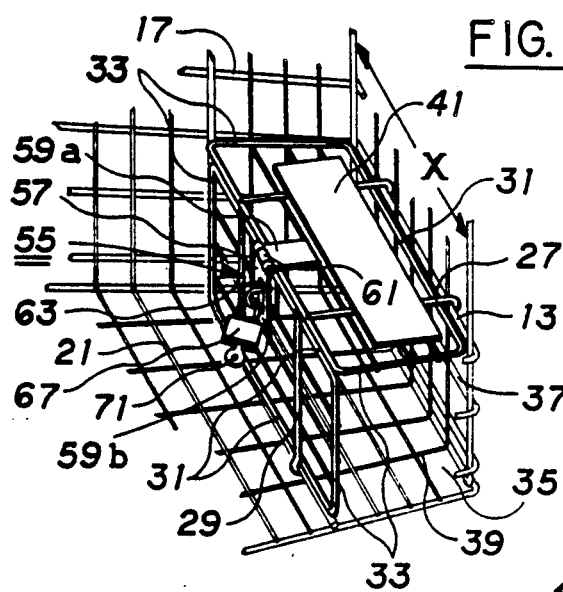
FIG. 2 is a fragmentary perspective view of the embodiment shown in FIG. 1.

One embodiment of the invention is shown in FIGS. 1 and 2. In this embodiment, two elongated panels 27 and 29 respectively, preferably rectangular in overall shape and approximately equal in overall size, are shown to be bounded by spaced-apart pairs of elongated peripheral side edges 31 and spaced-apart pairs of short peripheral end edges 33. The length of panels 27 and 29 are preferably set at the width "X" of front basket wall 13. Panels 27 and 29 are arranged for mutual contact along one of their elongated peripheral side edges 31 and then for insertion into basket 11 so that the other elongated peripheral side edges 31 may be placed into contact with front basket wall 13 and basket floor 21 and their short peripheral end edges may be placed adjacent to basket side walls 17 to form a generally rectangular enclosure 35. In this embodiment, front basket wall 13 forms the front panel 37 while basket floor 21 forms the bottom enclosure panel 39 of enclosure 35.

At least one of panels 27 or 29 is arranged to contain a hinged elongated peripheral side edge 31 for hinged attachment to either front wall 13 or basket floor 21 for pivoting to allow access into enclosure 35. Whatever panel is chosen, the short peripheral end edges 33 of that panel are not attached to basket side walls 17 but are placed in close proximity thereto. It is preferred that the other panel short peripheral end edges 33 are tied directly to basket side walls 17. In this embodiment, basket side walls 17 form the end panels of enclosure 35.

The stationary panels 27 or 29 may be tied or attached directly to basket floor 21 and basket side wall 17 through any known means such as ordinary fence or hog rings, welding, bending the individual rod ends around the wall and floor rods, or other known means. While not required, it is preferred that panels 27 and 29 be made in the same configuration as basket walls 13, 15 and 17, namely small-diameter, strong, metal rods in spaced-apart parallel arrangement about strong edge rods to provide security to enclosure 35.

As shown in FIG. 2, at least one of said panels 27 or 29 is adapted for display of advertising media such as by having a wooden, cardboard or plastic panel 41 attached to panel 27 so that advertising media could be placed thereon and provide the store owner with a new source of advertising income.

Figure 3:
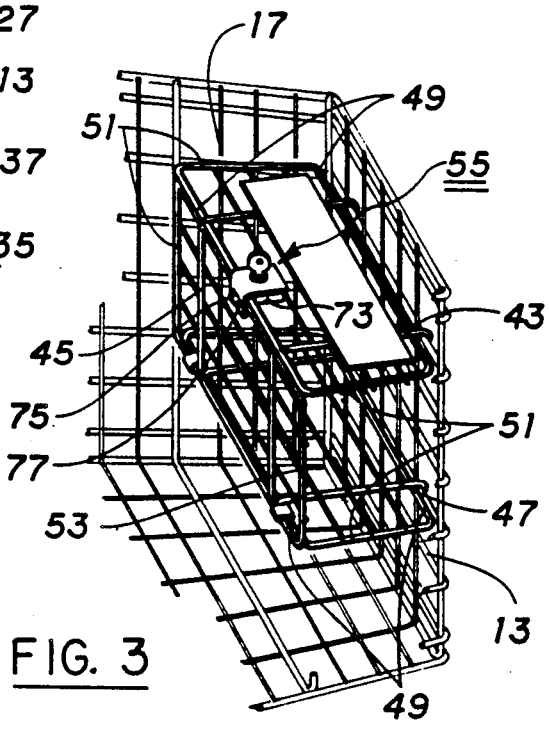
FIG. 3 is a fragmentary perspective view of another embodiment of the security device of this invention.

As shown in FIG. 3, another embodiment of this invention includes a plurality of, and preferably three, elongated panels 43, 45 and 47 respectively of similar length and outline as panels 27 and 29, each panel having a pair of spaced-apart elongated peripheral side edges 49 held in spaced-apart relationship by a pair of spaced-apart, short, peripheral end edges 51. In this embodiment, panels 43, 45 and 47 are interconnectable along their respective side edges 49 to form an enclosure 53 when placed in contact with front basket wall 13. In this embodiment as well, at least one panel has a hinged elongated side edge 49 to provide pivotal movement to said panel for access to the interior of enclosure 53.

In both embodiments, means 55 are provided for temporarily locking said respective enclosure against unwanted entry. One embodiment of means 55 is shown in FIG. 2 to comprise a hasp 57, itself comprising two hasp elements 59a and 59b interconnected through a hinge 61 wherein hasp element 59a is rigidly mounted to panel 27 by bolts and nuts (not shown) and arranged so that hasp element 59b will pivot down flat against panel 29. A slot 63 is formed in hasp element 59b and a U-shaped locking member is attached to panel 29 by nuts and bolts or other known means (not shown) and arranged for slipping through slot 63 when panels 27 and 29 are pivoted into contact so as to close enclosure 35. A padlock 67 contains a U-shaped lock element for slipping through U-shaped locking member and closed against padlock 67 so that a key 71 or other release mechanism may be employed to lock or unlock means 55.

As shown in FIG. 3, means 55 comprises a key-operated lock 73, mounted on panel 27, having a locking arm 75 for movement into contact with a receiving element 77 mounted on panel 27. Other types of locking means 55 are usable herein and fully contemplated in this invention. Locks shown may be any of several types, but their function will be to lock one panel to the other panel. Means 55 may also include locks provided by the shopper in case the shopper does not trust the lock already on the cart.

Figure 4:
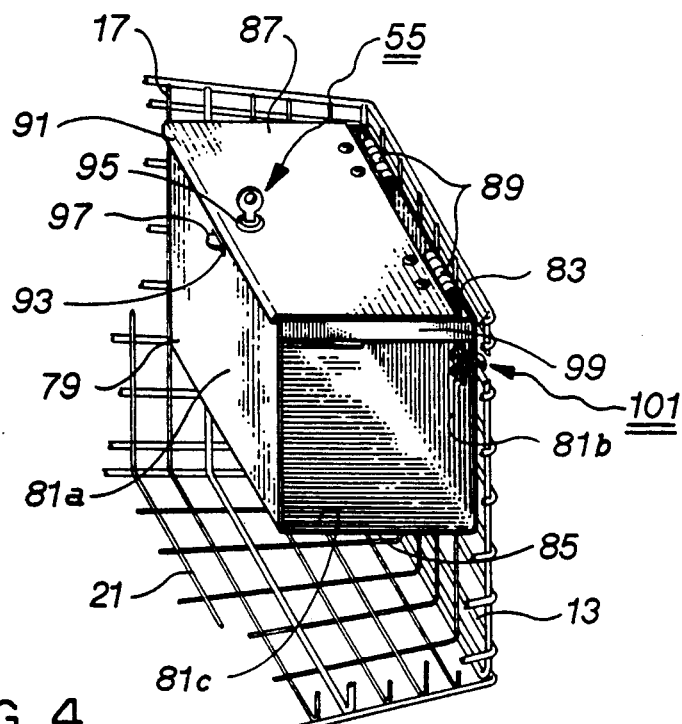
FIG. 4 is a fragmentary perspective view of another embodiment of the security device of this invention; and, FIG. 5 is another perspective view of another embodiment of this invention.

As shown in FIG. 4, another embodiment of this invention comprises an enclosure 79 formed by front, rear and bottom solid, elongated panels 81a, 81b and 81c respectively, each defined by spaced-apart elongated side edges 83 and shorter end edges 85, attached together along their respective side edges 83, to form a three-sided U-shaped configuration, and a fourth solid, elongated panel 87 attached by at least one, but preferably two, hinges 89 that are attached to rear panel 81b, to serve as a lid panel thereto. Front, rear and bottom panels 81a, 81b and 81c respectively extend into contact with spaced-apart side wa s 17 while lid panel 8 is slightly shorter in length to provide free, pivotal movement thereto, to allow unobstructed ingress and egress to the interior of enclosure 79.

A lip 91 extends outward and slightly downward from free side edge of lid panel 87 for overlapping arrangement with front panel 81a to provide protection against the insertion of a screw driver or other flat blade between the free edge of lid panel 87 and front panel 81a for unwanted entry into enclosure 79. It is preferred that lip 91 extend the full length of lid panel 87. While it is preferred that lip 91 engage the outside surface of front panel 81a when lid panel 87 is closed thereagainst, it is not fully necessary to have this arrangement and lip 91 may merely hang down in front of front panel 81a in overlapping arrangement.

Means 55 is again provided for temporarily locking said enclosure 79 against unwanted entry. In this embodiment, means 55 includes a slot 93 formed in front panel 81a for receipt therein of the locking arm of any particular lock that is used in this embodiment. As shown in FIG. 4, a cam-type lock 95 is mounted in an aperture formed in lid panel 87 having a cam lock arm 97 that can be swung into receipt for insertion in slot 93 by use of keys or other types of security devices. Typical hasp and padlock arrangement is also contemplated in this embodiment.

Figure 5:
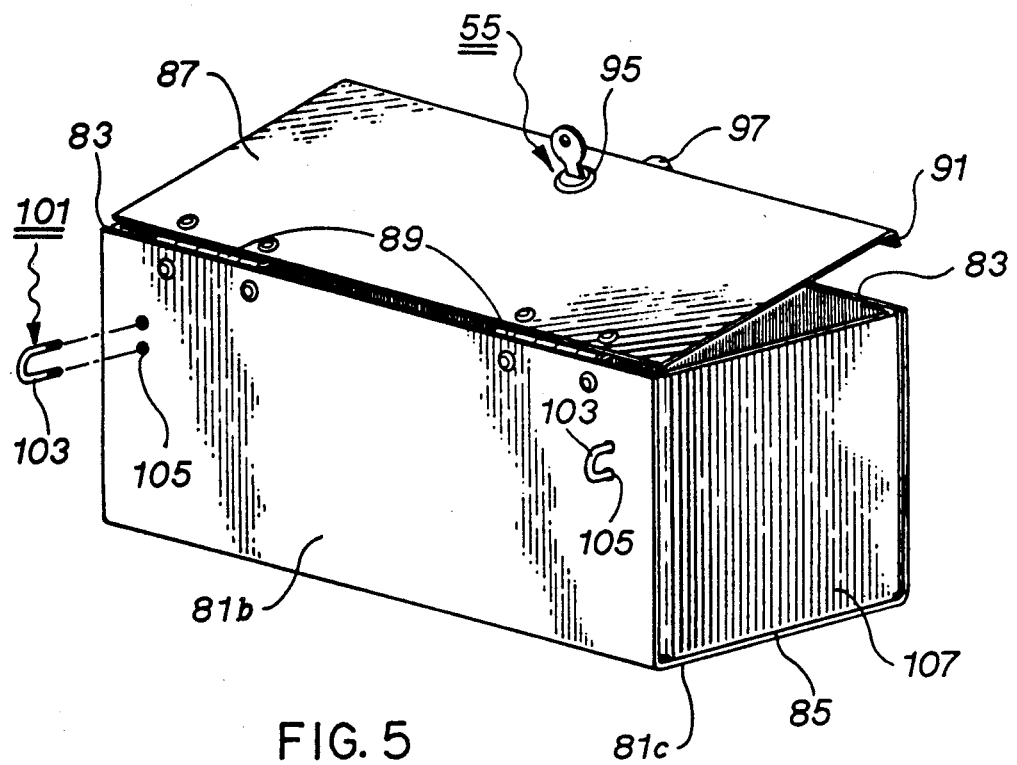

In this embodiment and the next one shown in FIG. 5, panels 81a, 81b, 81c and lid panel 87 are contemplated to be constructed of solid material that is non-corrosive and that provides a desirable base on which advertising media may be easily mounted. Preferred is stainless steel or other type metal. Such material, along with the metal making up the balance of the shopping cart, will withstand rough handling, exposure to the elements when taken out of doors into the parking lot by the customer, and will withstand the actions by store personnel in jamming the carts together in interlocking configuration for later utilization by the customer.

To further rigidify enclosure 79, a narrow side strip 99 is rigidly attached between front panel 81a and rear panel 81b, spaced apart from bottom panel 81c, and preferably up near the location of lid panel 87 as shown in FIG. 4.

Means 101 is provided for mounting enclosure 79 against either front cart wall 13 or basket floor 21. As shown in FIGS. 4 and 5, these latter embodiments are mounted to front cart wall 13 by the use of at least one but preferably two U-bolts 103 whose parallel legs extend through apertures 105 formed in rear panel 81b and over which are placed washers and nuts (not shown) in threadable reception thereon.

In the embodiment shown in FIGS. 4, the ends of enclosure 79 are open, covered only by spaced-apart side walls 17. During check-out, the check-out clerk may look through enclosure 79 from end to end, either by direct view or by observation by way of a mirror, to insure that there are no goods hidden in enclosure 79. As shown in FIG. 5, enclosure 79 may be further modified by replacing side strip 99 with full end panels 107 that are attached to the respective end edges of front, rear and bottom panels 81a, 81b and 81c. In this embodiment, enclosure 79 may be made of a variety of widths to accommodate purses of different lengths, as it has been determined that there is the possibility that persons in different areas of the United States use purses of different overall lengths. End panels 107 are preferred to be constructed of the same material that is used in the other portions of enclosure 79. In this embodiment, the store check-out clerk will then have to have the customer completely open lid panel 87 to view the interior of the enclosure to insure no hidden items are therein.

The portion of the cart as described is not disturbed by the proposed invention. Shopping carts telescoped together to save space and make it easier to handle them in large numbers. That characteristic of the carts likewise is not disturbed by this invention.

What is claimed is:

1. In a shopping cart comprising a frame, ground-engaging wheels supporting said frame, a handle to push said frame over the ground, and an open-topped shopping basket attached to said frame comprising integrally connected spaced-apart front and rear walls, spaced-apart side walls and a basket floor, a security device comprising:
   (a) three elongated panels arranged for mutual contact between said basket side walls to form a four-sided enclosure with said front basket wall;
   (b) wherein at least one said panel contains a hinged elongated edge allowing pivotal movement to said panel for access to said enclosure; and,
   (c) means for temporarily locking said enclosure against unwanted entry.

2. The security device of claim 1 wherein said panels are rectangular in shape.

3. The security device of claim 1 wherein at least one of said panels is adapted for display of advertising media.

4. The security device of claim 1 wherein said means includes a key-operated lock.

5. The security device of claim 1 wherein said means includes a hasp for attachment to one panel and a padlock for insertion in said hasp.

6. In a shopping cart comprising a frame, ground-engaging wheels supporting said frame, a handle to push said frame over the ground, and an open-top shopping basket attached to said frame comprising integrally connected spaced-apart front and rear walls, spaced-apart side walls and a basket floor, the improvement comprising:
   (a) an enclosure formed by front, rear and bottom solid elongated panels, defined by spaced-apart elongated side edges and shorter end edges, attached together along their respective side edges, to form a three-sided U-shaped configuration, and a fourth solid, elongated panel hingedly attached to said rear panel, serving as a lid thereto, said front, rear, and bottom panels extending into contact with said side walls and said lid panel slightly shorter in length for free, pivotal movement to provide ingress and egress to the interior of said enclosure;
   (b) a lip extending outward and downward from the free side edge of said lid panel for overlapping arrangement with said front panel, to provide protection against unwanted prying of said lid;
   (c) first means including a slot formed in said front panel for temporary locking said lid in contact with said front panel; and,
   (d) second means for mounting said enclosure against said shopping cart front wall.

7. The improvement of claim 6 wherein said first means includes a cam-type lock mounted in said lid panel and adapted to have said cam lock move into and out of receipt in said slot.

8. The improvement of claim 6 wherein said second means includes at least one U-bolt for passing about one of said rods making up said front basket wall and thereafter passing through apertures formed in said rear enclosure panel for receipt thereon of washers and nuts to affix said enclosure to said cart.

9. In a shopping cart comprising a frame, ground-engaging wheels supporting said frame, a handle to push said frame over the ground, and an open-top shopping basket attached to said frame comprising integrally connected spaced-apart front and rear walls, spaced-apart side walls and a basket floor, the improvement comprising:
   (a) an enclosure formed by front, rear and bottom solid, elongated panels, defined by spaced-apart elongated side edges and shorter end edges, attached together along their respective side edges, to form a three-sided, U-shaped configuration, and a fourth solid, elongated panel hingedly attached to said rear panel, serving as a lid thereto;
   (b) a lip extending outward and downward from the free side edge of said lid panel for overlapping arrangement with said front panel, to provide protection against unwanted prying of said lid;
   (c) means including a slot formed in said front panel for temporary locking said lid in contact with said front panel;
   (d) second means for mounting said enclosure against said shopping cart front wall; and,
   (e) at least one solid end panel integrally attached to said shorter end edges of said front, rear and bottom panels, and wherein the other respective end of said front, rear and bottom panels extend into contact with one of said cart side walls.

10. In a shopping cart comprising a frame, ground-engaging wheels supporting said frame, a handle to push said frame over the ground, and an open-top shopping basket attached to said frame comprising integrally connected spaced-apart front and rear walls, spaced-apart side walls and a basket floor, the improvement comprising:
   (a) an enclosure formed by front, rear and bottom solid, elongated panels, defined by spaced-apart elongated side edges and shorter end edges, attached together along their respective side edges, to form a three-sided, U-shaped configuration, and a fourth solid, elongated panel hingedly attached to said rear panel, serving as a lid thereto;
   (b) a lip extending outward and downward from the free side edge of said lid panel for overlapping arrangement with said front panel, to provide protection against unwanted prying of said lid;
   (c) first means including a slot formed in said front panel for temporary locking said lid in contact with said front panel;
   (d) second means for mounting said enclosure against said shopping cart front wall; and,
   (e) including a pair of spaced-apart solid end panels, each respectively attached to the respective shorter end edges of said front, rear and bottom panels.

* * * * *